United States Patent
Duvall (10) Patent No.: US 7,985,394 B2
(45) Date of Patent: Jul. 26, 2011

(54) SYSTEM AND METHOD FOR MANUFACTURING CARBON NANOTUBES

(76) Inventor: Gideon Duvall, Boca Raton, FL (US)

( * ) Notice: Subject to any disclaimer, the term of this patent is extended or adjusted under 35 U.S.C. 154(b) by 47 days.

(21) Appl. No.: 11/901,986

(22) Filed: Sep. 19, 2007

(65) Prior Publication Data

US 2009/0311168 A1     Dec. 17, 2009

(51) Int. Cl.
*D01F 9/12* (2006.01)
*C01B 31/02* (2006.01)
*C01B 31/00* (2006.01)

(52) U.S. Cl. .............. 423/445 R; 423/447.5; 423/447.1; 977/842

(58) Field of Classification Search .................. None
See application file for complete search history.

(56) References Cited

U.S. PATENT DOCUMENTS

| | | | |
|---|---|---|---|
| 3,341,302 A * | 9/1967 | Flanigen et al. ................. 117/80 |
| 4,048,799 A | 9/1977 | Golan et al. | |
| 4,404,177 A * | 9/1983 | Derbyshire et al. ............ 117/10 |
| 4,980,133 A | 12/1990 | Koch | |
| 5,039,653 A | 8/1991 | Jackson et al. | |
| 6,455,021 B1 | 9/2002 | Saito | |
| 6,683,783 B1 | 1/2004 | Liu et al. | |
| 6,749,827 B2 | 6/2004 | Smalley et al. | |
| 6,756,025 B2 | 6/2004 | Colbert et al. | |
| 6,756,026 B2 | 6/2004 | Colbert et al. | |
| 6,913,789 B2 | 7/2005 | Smalley et al. | |
| 6,939,525 B2 | 9/2005 | Colbert et al. | |
| 6,949,237 B2 | 9/2005 | Smalley et al. | |
| 6,979,709 B2 * | 12/2005 | Smalley et al. ................. 524/495 |
| 7,052,668 B2 | 5/2006 | Smalley et al. | |
| 7,067,098 B2 | 6/2006 | Colbert et al. | |
| 7,071,406 B2 | 7/2006 | Smalley et al. | |
| 7,097,820 B2 | 8/2006 | Colbert et al. | |
| 7,105,596 B2 | 9/2006 | Smalley et al. | |
| 7,108,841 B2 | 9/2006 | Smalley et al. | |
| 2002/0090330 A1 | 7/2002 | Smalley et al. | |
| 2002/0090331 A1 | 7/2002 | Smalley et al. | |
| 2002/0109086 A1 | 8/2002 | Colbert et al. | |
| 2002/0127162 A1 | 9/2002 | Smalley et al. | |
| 2003/0010910 A1 | 1/2003 | Colbert et al. | |
| 2003/0066960 A1 | 4/2003 | Colbert et al. | |
| 2005/0129948 A1 | 6/2005 | Furukawa et al. | |
| 2005/0161662 A1 | 7/2005 | Majumdar et al. | |
| 2007/0009421 A1 | 1/2007 | Kittrell et al. | |
| 2007/0048209 A1 | 3/2007 | Smalley et al. | |
| 2007/0099421 A1 | 5/2007 | Kim et al. | |

OTHER PUBLICATIONS

Gorbunov et al.; Solid-Liquid-Solid Growth Mechanism of Single Wall Carbon Nanotubes; Carbon, 40, 113-118; 2002.*
Sumiyoshi et al.; Preparation of Graphite Single-Crystal from an Iron Solution by a Temperature-Gradient Method; Bull. Chem. Soc. Jpn.; 63, 2318-2322; 1990.*
S.B. Austerman, S.M. Myron and J.W. Wagner, Growth and Characterization of Graphite Single Crystals, Atomics International, Jul. 31, 1967, 549-557, vol. 5, Pergamon Press Ltd., great Britain.

(Continued)

*Primary Examiner* — Melvin C Mayes
*Assistant Examiner* — Guinever S Gregorio
(74) *Attorney, Agent, or Firm* — Fish & Richardson P.C.

(57) ABSTRACT

A system and method for manufacturing carbon nanotubes via epitaxial growth from a source of supersaturated carbon solution is disclosed, whereby selection of the diameter, length, and chirality of single-walled or multi-walled nanotubes is enabled.

19 Claims, 5 Drawing Sheets

OTHER PUBLICATIONS

C. Roscoe, D. Nagle, S.B. Austerman, Growth of Graphite Single Crystals from Iron-Carbon Solutions, Journal of Material Science, 1971, 998-1006, Issue 6, Chapman and Hall Ltd., Pennsylvania.

Tokiti Noda, Yoshihro Sumiyoshi and Noriaki Ito, Growth of Single Crystals of Graphite from a Carbon-Iron Melt, Feb. 10, 1968, 813-816, vol. 6, Pergamon Press Ltd., Great Britain.

Austerman et al., "Graphite Crystal Growth", *Atomics Intern.*, Aug. 15, 1968, pp. 1-22.

Baraniecki et al., "Some Aspects of Graphitization Induced by Iron and Ferro-Silicon Additions", *Carbon*, 1969, vol. 7, pp. 213-224.

Behler et al., "Effect of Thermal Treatment on the Structure of Multi-walled Carbon Nanotubes", *Journal of Nanoparticle Research*, 2006, 11 pages.

Ching-Li et al, "Preparation of Single-Crystal Graphite from Melts", *Nature*, 1961, pp. 864-865.

Ding et al., "The Importance of Strong Carbon-Metal Adhesion for Catalytic Nucleation of Single-Walled Carbon Nanotubes", *Nano Letters*, 2008, vol. 8, No. 2, pp. 463-468.

Ding et al., "Structure and Thermal Properties of Supported Catalyst Clusters for Single-Walled Carbon Nanotube Growth", *Elsevier*, 2006, pp. 5254-5258.

Ding et al., The Importance of Supersaturated Carbon Concentration and its Distribution in Catalytic Particles for Single-Walled Carbon Nanotube Nucleation, *Institute of Physics Publishing*, 2006, vol. 8, No. 2, pp. 543-548.

Joshima et al., "Growth of Graphite Crystal Using Iron Solution", 1982, pp. 525-526.

Nikol' skaya et al., "A Study of Graphite Crystals Grown from a Solution of Carbon in Molten Iron", *Khimiya Tverdogo Topliva*, 1976, vol. 10, No. 6, pp. 36-39.

Okamoto H., "The C-Fe (Carbon-Iron) System", *Journal of Phase Equilibria*, 1992, vol. 13, No. 5, pp. 543-564.

Smalley et al., "Single Wall Carbon Nanotube Amplification: En Route to a Type-Specific Growth Mechanism", *J Am. Chem. Soc.*, 2006, pp. 15824-15829.

Tulloch et al., "Synthetic Single Crystals of Graphite", *Nature*, 1966, pp. 730-731.

Wang et al., "Nano Letters: Continued Growth of Single-Walled Carbon Nanotubes", *American Chemical Society*, vol. 5, No. 6, Jun. 2005, pp. 998-1002.

Yudasaka et al., "Causes of Different Catalytic Activities of Metals in Formation of Single-wall Carbon Nanotubes", *Appl. Phys.*, 2002, A 74, pp. 377-385.

Yun et al., "Growth Mechanism of Long Aligned Mutliwall Carbon Nanotube Arrays by Water-Assisted Chemical Vapor Deposition", *J. Phys. Chem. B*, 2006, 110, pp. 23920-23925.

Philosophical Magazine, http://dx.doi.org/10.1080/14786430601032352, 10 pages.

* cited by examiner

SYSTEM AND METHOD FOR MANUFACTURING CARBON NANOTUBES

TECHNICAL FIELD

The present invention relates generally to nanotechnology, and more particularly to a system and method for manufacturing carbon nanotubes.

BACKGROUND OF THE INVENTION

The numerous and varied beneficial properties of carbon nanotubes have been widely heralded, including their high modulus, high strain-to-failure ratio, and high current density. Since these benefits are well documented, an in-depth discussion thereof is unnecessary, and will be understood by those ordinarily skilled in the art. It is, however, helpful to highlight a few of the benefits of carbon nanotubes in order to put the advantages of the present invention in proper context. One benefit of carbon nanotubes is their ability to exhibit electrical properties of semi-conducting or metallic materials, depending on chirality, and to exhibit varying electrical properties depending on tube diameter. Another benefit is their ability to form efficient nanoscale machines due to the low coefficient of friction between an inner carbon nanotube and an outer carbon nanotube during either or both of linear and rotational relative motion. Yet another benefit is the high tensile strength of carbon nanotubes (especially combined with the low density of carbon nanotubes) relative to other available fibers.

Despite such beneficial properties, integration of carbon nanotubes into commercial products is currently problematic, and has, therefore, not become wide-spread, due to shortcomings associated with conventional methods of manufacture thereof, including laser-ablation, arc-discharge, and chemical-vapor-deposition (CVD) techniques. Specifically, conventional methods of manufacture for carbon nanotubes suffer, to varying degrees, from one or more disadvantages, such as high energy usage, random structural formation (including random dimensions, wall-structure, and chirality) and the associated need for manual sorting, consumption of catalyst materials, inter-mixture of waste or by-products with the carbon nanotubes and the associated need for cleaning, occurrence of defects in manufactured carbon nanotubes, limited length of manufactured carbon nanotubes, and limited batch size. These disadvantages, among others, result in high costs of manufacture for carbon nanotubes and fail to provide a viable method for large-scale manufacture of carbon nanotubes, especially for those having lengths in the millimeter range or larger.

As such, it is clear that there is an unmet need for a system and method for manufacturing carbon nanotubes whereby selection of the diameter, length, chirality, and wall structure of individual carbon nanotubes formed thereby is enabled. Such a system and method will preferably enable selective manufacture of carbon nanotubes having predetermined properties, including physical, electrical, optical, and thermal properties, among others, whereby a consistent supply of identical carbon nanotubes may be provided for integration into or production of commercial products.

BRIEF SUMMARY OF THE INVENTION

Briefly described, in a preferred embodiment, the present invention overcomes the above-mentioned disadvantages and meets the recognized need for such a method by providing a method of manufacturing a carbon nanotube including the steps of dissolving carbon in a flux melt, creating a supersaturated portion of the melt, contacting a nucleation site with the supersaturated portion, whereby carbon atoms bond to the nucleation site to form a carbon nanotube. The carbon nanotube may be elongated by extraction of the carbon nanotube from the supersaturated portion such that an open end of the carbon nanotube remains in contact with the supersaturated portion, whereby the open end provides a site for continued growth of the carbon nanotube. Thus, carbon nanotubes having lengths in the millimeter scale, or larger, may be manufactured.

The supersaturated portion is preferably formed via undercooling as the result of a temperature gradient that is substantially constantly maintained within the melt. The temperature gradient is preferably controlled to maintain the supersaturated portion at a temperature where hexagonal molecular-carbon rings are stable and where pentagonal and other stereochemical molecular-carbon rings are unstable, whereby defects in the manufactured carbon nanotube may be avoided. The temperature gradient is likewise preferably controlled to maintain the supersaturated portion at a temperature where carbon nahotubes are structurally stable, whereby defects in or damage to the manufactured carbon nanotube may be avoided.

When the temperature gradient, and thus the degree of undercooling, is small, the melt is only slightly supersaturated, whereby spontaneous homogeneous nucleation and other crystallization of the carbon is avoided, such that the introduced nucleation site, i.e. a seed carbon nanotube, provides the only site for precipitation of carbon from the supersaturated melt, thereby ensuring the desired heterogeneous crystallization on the open end of a nanotube, or other nucleation site. The temperature gradient additionally may be used to open a closed end or tip, such as a hemispherical end, of a seed carbon nanotube, by dissolving pentagonal, or other, molecular carbon rings structures to form an open-ended seed carbon nanotube, whereby the open end provides a nucleation site.

The present invention preferably further provides a system for manufacturing carbon nanotubes including means for forming a flux melt, means for supplying carbon to the flux melt, means for contacting a nucleation site of a probe with the flux melt, and means for extracting the probe from the flux melt, whereby carbon dissolved in the flux melt may bond with the nucleation site to form a carbon nanotube. The system may additionally include means for removing oxygen from the environment surrounding the melt, thereby preventing oxidation of the carbon and/or melt materials. Flow control means, such as one or more baffles, may be included in the system, whereby the nucleation process may proceed undisturbed from convection currents within the melt, or from any other fluid flow.

The means for forming a flux melt may be furnace containing a crucible, such as a zirconia, alumina, or other ceramic crucible, a metallic crucible, or the like, for containing a molten flux material, such as a metal, with or without dissolved carbon, and a heat source, such as one or more resistive heating element, disposed therewithin. The furnace or other means for forming a flux melt may include sensor means, such as a optical pyrometer, a thermocouple, or the like, for determining a physical parameter of the flux melt, such as a temperature thereof, for use in controlling the heat source, whereby convection currents, flux composition, and/or a thermal gradient within the flux melt may be regulated.

The means for supplying carbon to the melt may be means for introducing a carbon-containing fluid to the flux melt, such as a fluid conduit having an output within the flux melt whereby carbon atoms may dissolve in the flux material or a solid rod of graphite, carbon black, or the like that may be submerged in the flux melt for dissolution therein. The means for supplying carbon preferably supplies a sufficient supply of carbon to saturate the flux melt with carbon, at least within a dissolution region surrounding the carbon supply material, and sufficient to replenish dissolved carbon that precipitates out of solution, such as through nucleation at the nucleation site of the probe, to maintain a desired carbon saturation level in respective regions of the flux melt. A flux material supply means may additionally be included to replenish any flux material lost from the flux melt, such as through evaporation or other consumption.

The probe is preferably linearly actuatable in a direction normal to a surface of a carbon supersaturated region of the flux melt, whereby one or more nucleation site disposed thereon, such as one or more seed carbon nanotube and/or one or more nanometer scale catalyst particle, may be contacted with the carbon supersaturated region of the flux melt to allow formation of one or more carbon nanotube thereon. Subsequently, the probe may be extracted to allow continued growth and elongation of the one or more carbon nanotube.

Accordingly, one feature and advantage of the present invention is its ability to control the characteristics, such as physical and electrical characteristics, of manufactured nanotubes via selection of a seed carbon nanotube having desired characteristics, whereby a predictable supply of carbon nanotubes of varying characteristics may be manufactured to supply industry requirements.

Another feature and advantage of the present invention is its ability to allow manufacture of carbon nanotubes having lengths in the millimeter scale or longer, whereby new applications of carbon nanotube technology may be enabled.

Yet another feature and advantage of the present invention is its ability to reduce the cost of manufacture of carbon nanotubes via elimination or reduction of costs associated with energy usage, sorting processes, cleaning processes, defect rate, and raw material consumption.

These and other features and advantages of the present invention will become more apparent to those ordinarily skilled in the art after reading the following Detailed Description and Claims in light of the accompanying drawing Figures.

BRIEF DESCRIPTION OF THE DRAWINGS

Accordingly, the present invention will be understood best through consideration of, and with reference to, the following drawing Figures, viewed in conjunction with the Detailed Description referring thereto, in which like reference numbers throughout the various Figures designate like structure, and in which.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

In that form of the preferred embodiment of the present invention chosen for purposes of illustration, FIGS. 1-5 show system 100 for manufacturing carbon nanotubes including means 110 for creating flux melt 117, means 120 for supplying carbon to flux melt 117, means 130 for contacting nucleation site 133 of probe 131 with flux melt 117, and means 140 for extracting probe 131 from flux melt 117.

Figure 1:
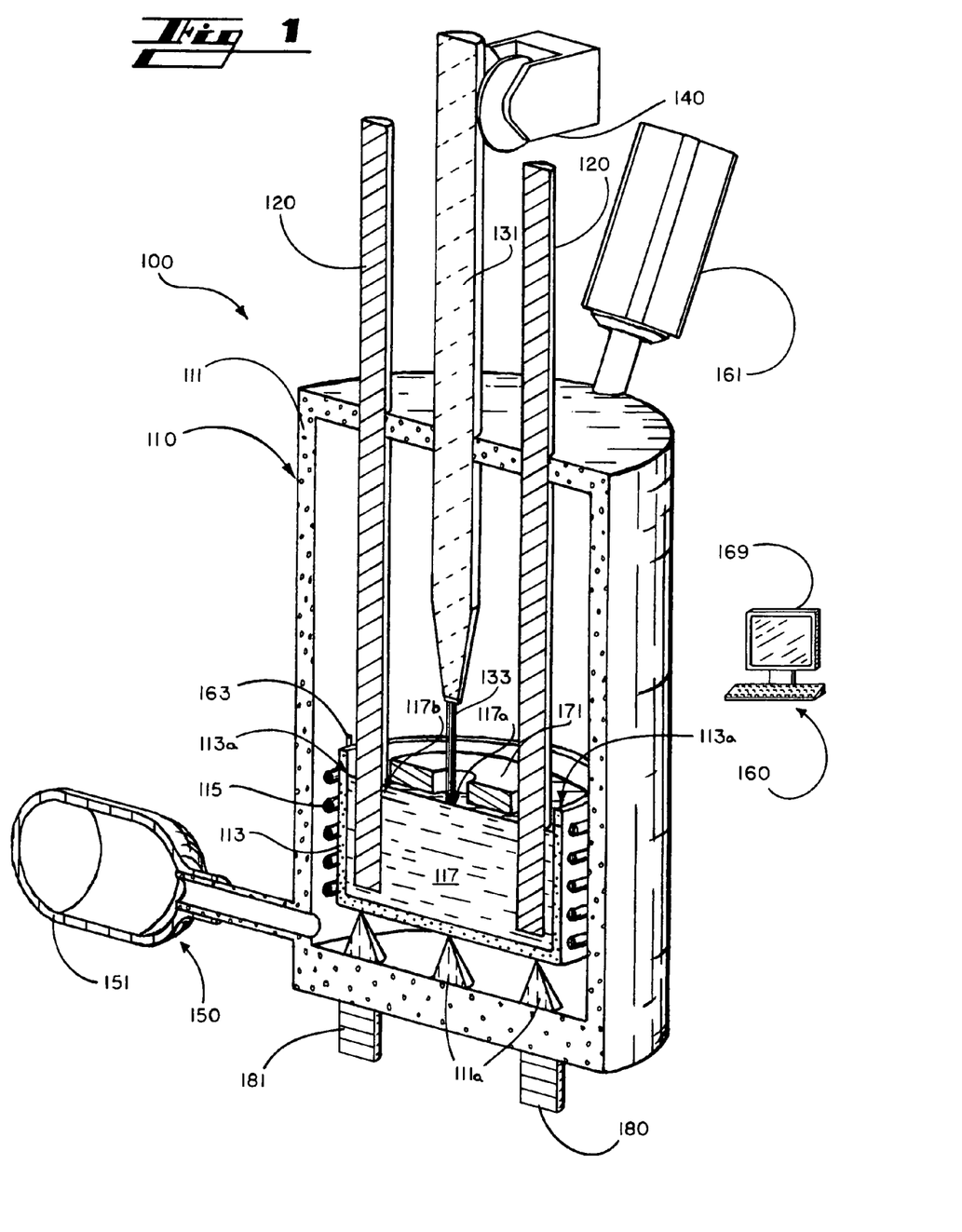
FIG. 1 is a cross-sectional view of a system for manufacturing carbon nanotubes.

Means 110 for creating flux melt 117 is preferably formed as furnace 111 having crucible 113 disposed therein, such as mounted to thermal isolation means 111a of furnace 111, and one or more heating element 115 disposed around crucible 113. Heating element 115 may be formed as an inductive heating element or other resistive heating element. Selective activation of heating element 115 generates heat within furnace 111, and preferably causes melting of a fluxing material disposed within crucible 113, such as a metal selected from the group consisting of nickel, iron, platinum, palladium, rhodium, chromium, molybdenum, and the like. Additionally, the fluxing material may be selected from the group of metal alloys, or the group of metal salts, and preferably comprises at least one of nickel, iron, platinum, palladium, and rhodium. To prevent oxidation of the fluxing material (and/or carbon, when added), means 150 for removing oxygen from furnace 111 is employed. Means 150 for removing oxygen may comprise inert gas source 151 in operable connection with furnace 111 to allow an inert gas, such as argon, or the like, with or without an oxygen-reducing material, such as carbon monoxide, to flow into furnace 111 at a pressure at or above atmospheric pressure, whereby oxygen and oxygen-donor compounds are forced from furnace 111, and whereby the formation of oxides is prevented or reduced.

Feedback and control means 160, including optical pyrometer 161, thermocouple 163, scale 165, and/or other sensor device, and controller 169, is preferably operable with furnace 111 whereby a parameter value, such as temperature, within furnace 111 may be sensed, and whereby a signal indicative thereof may be transmitted to controller 169 for use in generation of a control signal. The control signal may be a signal to activate, deactivate, or otherwise adjust or control heating element 115, means 150 for removing oxygen, means 120 for supplying carbon, or the like, to adjust the sensed parameter value to a predetermined value. Alternatively, an operator may receive one or more indications of a respective sensed parameter value, and may adjust heating element 115, means 150 for removing oxygen, means 120 for supplying carbon, or the like. For example, when a temperature sensed by optical pyrometer 161, or thermocouple 163, is less than a predetermined value, controller 169, or an operator, may activate or adjust heating element 115 to increase the temperature within furnace 111 to achieve a value substantially equal to, or slightly above, the predetermined value in response to a control signal or another indication of the sensed value.

Various other sensors may be employed, either additionally or alternatively, such as with feedback and control means 160, to monitor various parameters of the manufacturing process. For example, when electrically-conducting carbon nanotubes are manufactured, a sensor may be included to monitor a resistance of one or more manufactured carbon nanotube, a current passing therethrough, a voltage thereacross, a magnetic field induced therearound, or the like, whereby cessation of growth or defect formation may be detected and/or indicated. As will be readily understood by those ordinarily skilled in the art, growth cessation and/or defect formation will reduce, at least to some extent, a flow of electrical current through the manufactured carbon nanotube, and through flux melt 117, if necessary, due to an increase in electrical resistance. Such increase in electrical resistance may be detected as a reduction in electrical current, as an increase in voltage drop, or as a decrease in magnetic field strength.

In use, controller 169, or an operator, may adjust heating element 115 to produce a temperature of between approximately 1300° C. and approximately 1800° C. within furnace 111, whereby flux melt 117 may not solidify, and whereby carbon may dissolve therein. Heating element 115 is preferably arranged so as to create a steady-state thermal gradient within flux melt 117, wherein at least one cooler portion 117a of flux melt 117 is disposed proximate a first portion of crucible 113, such as further from heating element 115, or edge 113a of crucible 113, than warmer portion 117b disposed proximate a second portion of crucible 113. The creation and maintenance of the steady-state thermal gradient preferably allows cooler portion 117a of flux melt 117 to become supersaturated with carbon, such as via cooling beyond a liquid region of flux melt 117 (i.e. past a liquidus line of the carbon/flux phase diagram, or from a flux-carbon homogeneous liquid equilibrium state to a temperature at which solid graphite and liquid flux-carbon liquid exist in a heterogeneous equilibrium), whereby crystallized carbon may form in such a supersaturated portion.

A temperature of approximately 1500° C. is preferred within cooler portion 117a when iron or nickel are used as the fluxing material such that dissolved carbon will form one or more hexagonal molecular-carbon ring upon crystallization in the supersaturated portion due to the relative instability of other stereochemical arrangements of molecular carbon (such as pentagonal or other geometries) at temperatures above approximately 1300° C. The 1500° C. temperature is also preferred such that damage to a manufactured carbon nanotube may be avoided due to the structural instability of carbon nanotubes above temperatures of approximately 1800° C.

Means 120 for supplying carbon to flux melt 117 may be formed as one or more rod 121 of carbon black, graphite, or the like, disposed, at least in part, in contact with flux melt 117, whereby rod 121 may dissolve in flux melt 117 when sufficient temperature is achieved. Means 120 for supplying carbon preferably provides sufficient carbon to saturate flux melt 117 with dissolved carbon, and to replenish any carbon precipitating out of solution, such as that forming one or more carbon nanotube being manufactured from flux melt 117. Preferably, in order to facilitate such replenishment, rod 121 is movable, such as automatically via a motor (not shown), or manually via an operator, to ensure continued contact between rod 121 and flux melt 117 as rod 121 dissolves. Scale 165, or other sensor, may be used to automatically monitor an amount of carbon and/or an amount of flux material present in crucible 111, whereby controller 169, or an operator, may determine when additional carbon and/or flux material may need to be added in order to maintain a selected composition of flux melt 117. Rod 121 may additionally include a predetermined percentage of the fluxing material whereby any loss thereof may be counteracted by contemporaneous supply of both carbon and the fluxing material via dissolution of rod 121.

Alternatively, means 120 for supplying carbon may be formed as fluid source of carbon 123, such as a hydrocarbon fluid or other carbon containing fluid, such as methane, carbon monoxide, or an organometallic fluid, in operable engagement with flux melt 117 to provide the fluid source of carbon thereto, whereby carbon may be dissolved in flux melt 117. When such a fluid source of carbon is used, the operable engagement may include pipe 125 formed of alumina, zirconia, or other suitable ceramic material, a metallic material, or the like, capable of conducting the fluid source of carbon to flux melt 117, preferably at warmer portion 117b thereof. If a fluid carbon source is employed, the fluxing material may be supplied via a separate rod (not shown), or via another method of supply of the fluxing material to flux melt 117 to replenish lost fluxing material, such as via the organometallic fluid.

Figure 2:
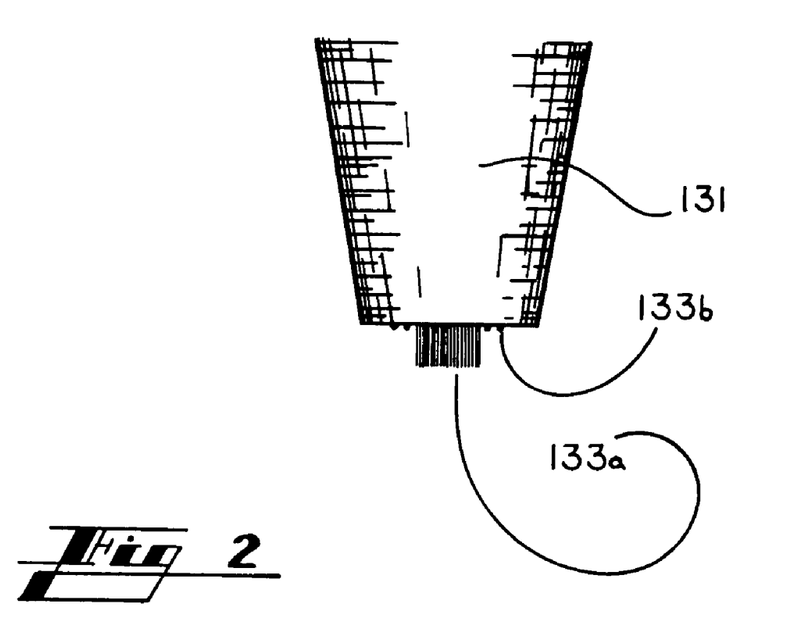
FIG. 2 is a front view of probe tips of the system of FIG. 1 illustrating the detail thereof.

When cooler portion 117a of flux melt 117 becomes supersaturated, and reaches the proper temperature, i.e. the proper degree of undercooling, probe 131 may be moved, such as automatically via means 130 in the form of a motor or linear actuator, or manually via an operator, to contact nucleation site 133 with flux melt 117 at cooler portion 117a. Nucleation site 133 may be formed as one or more seed carbon nanotube 133a and/or one or more nanoscale catalyst particle 133b mounted on probe 131, either directly or via substrate 132, whereby nucleation site 133 initiates precipitation of carbon out of solution. Nucleation site 133 is preferably formed as one or more seed carbon nanotube 133a having an open distal end (arranged distal to probe 131), whereby one or more carbon nanotube may be manufactured having pre-selected properties, including geometric properties, such as tube diameter and/or chirality, and electric properties, such as conductivity and/or band-gap energy, via selection of a respective seed carbon nanotube 131a having the pre-selected properties.

The open end of seed carbon nanotube 133a provides a bonding site for carbon atoms in flux melt 117 whereby heterogeneous precipitation may occur as carbon atoms bond to the open end of seed carbon nanotube 133a. Thus, one or more carbon nanotube may be manufactured via contact of nucleation site 133 with supersaturated cooler portion 117a, wherein such bonding of carbon atoms from flux melt 117 to seed carbon nanotube 133a occurs, causing elongation thereof.

As seed carbon nanotube 133a grows, such as via bonding of carbon atoms from solution, means 140 for extracting probe 131, such as in the form of a motor or linear actuator, may move probe 131 away from flux melt 117a at a rate substantially equal to a rate of growth of seed carbon nanotube 133a, whereby the open end thereof may remain disposed proximate a desired portion or flux melt 117, such as cooler portion 117a. Such maintenance of contact between seed carbon nanotube 133a and cooler portion 117a preferably ensures continued growth, via elongation, of seed carbon nanotube 133a. As such, carbon nanotubes of indefinite length may be grown, whereby carbon nanotubes having lengths greater than a few millimeters may predictably be manufactured and supplied for use in industry and/or research. Furthermore, the manufacturing process described above allows for selective manufacture of carbon nanotubes having desired properties, and not only eliminates sorting and cleaning procedures associated with conventional methods of manufacture, but also eliminates random growth-cessation and defect incorporation via selective maintenance of the temperature of flux melt 117 at a temperature where only hexagonal molecular-carbon rings are stable.

Specifically, controller 169, or an operator, maintains the temperature of flux melt 117 approximately at a temperature between approximately 1300° C. and approximately 1800° C., such as at approximately 1500° C., to ensure that flux melt 117 persists in a liquid region of the carbon/flux material phase diagram in warmer portion 117b and persists in a region of the carbon/flux material phase diagram characterized by a liquid and graphite solution in cooler portion 117a. Maintenance of such a temperature ensures that formation of pentagonal molecular-carbon rings, and the associated non-linear tube wall growth, is prevented, whereby structural integrity of the manufactured carbon nanotube is ensured. Furthermore, maintenance of flux melt 117 at a temperature between approximately 1300° C. and approximately 1800° C. allows any non-linear portion (i.e. any portion including pentagonal molecular-carbon rings) of seed carbon nanotube 133a to be dissolved upon contact therewith. As such, even if seed carbon nanotube 133a includes a closed or hemispherical tip or end, flux melt 117 may open such closed or hemispherical tip or end by dissolving the carbon of the tip or end, whereby carbon atoms may bond to seed carbon nanotube 133a in a hexagonal pattern, thereby ensuring continued linear growth. Thus, an oxidation process, or other tip-opening process, may be avoided.

Means 110 for creating flux melt 117 is preferably configured to create a steady-state thermal gradient that is sufficiently small to prevent homogenous precipitation of carbon from flux melt 117. Specifically, the temperature gradient is preferably not greater than necessary to allow supersaturation of cooler portion 117a, such as not greater than approximately 2% below the liquidus temperature for the selected flux material and percent composition of flux melt 117. Maintenance of such a relatively small thermal gradient, associated degree of undercooling, and thus the driving force for precipitation, not only prevents homogenous precipitation, but also preferably prevents or reduces formation of graphite or other carbon solids on the sides of seed carbon nanotube 133a, whereby defects in the manufactured carbon nanotubes are reduced or eliminated.

It is important to note, however, that because the degree of undercooling largely determines the driving force for precipitation and an amount of carbon in the solution available for bonding, thus affecting carbon nanotube growth rate, the degree of undercooling may be adjusted to achieve the desired balance of epitaxial growth rate and carbon nanotube defect rate (i.e. quality). Of course, market concerns may also be weighed in determining the degree of undercooling, whereby the economic efficiency of the manufacturing process may be increased to allow a manufacturing facility to maximize revenue. One method by which a higher epitaxial growth rate may be supported is by selection of the fluxing material based, at least in part, on a diffusion rate of carbon therein. Specifically, a higher carbon diffusion rate may enable a rate of carbon replenishment sufficient to match a rate of carbon depletion associated with higher rates of epitaxial growth, including higher rates achieved by simultaneous manufacture of multiple carbon nanotubes. Additionally, silicon or other additives may be included to increase a carbon diffusion rate in a selected fluxing material, and/or to improve carbon graphitization.

Figure 4:
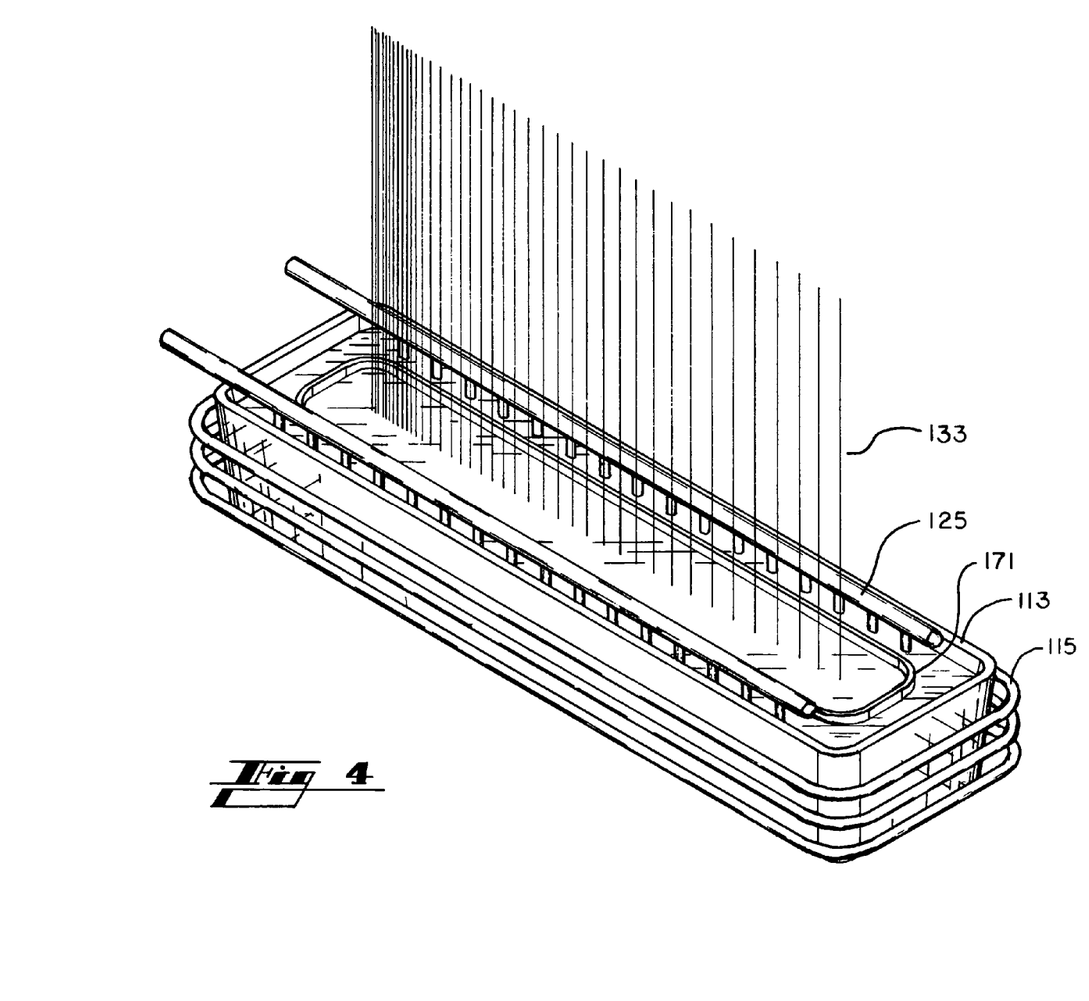
FIG. 4 is a perspective view of yet another alternative configuration for the system for manufacturing carbon nanotubes.
Figure 5:
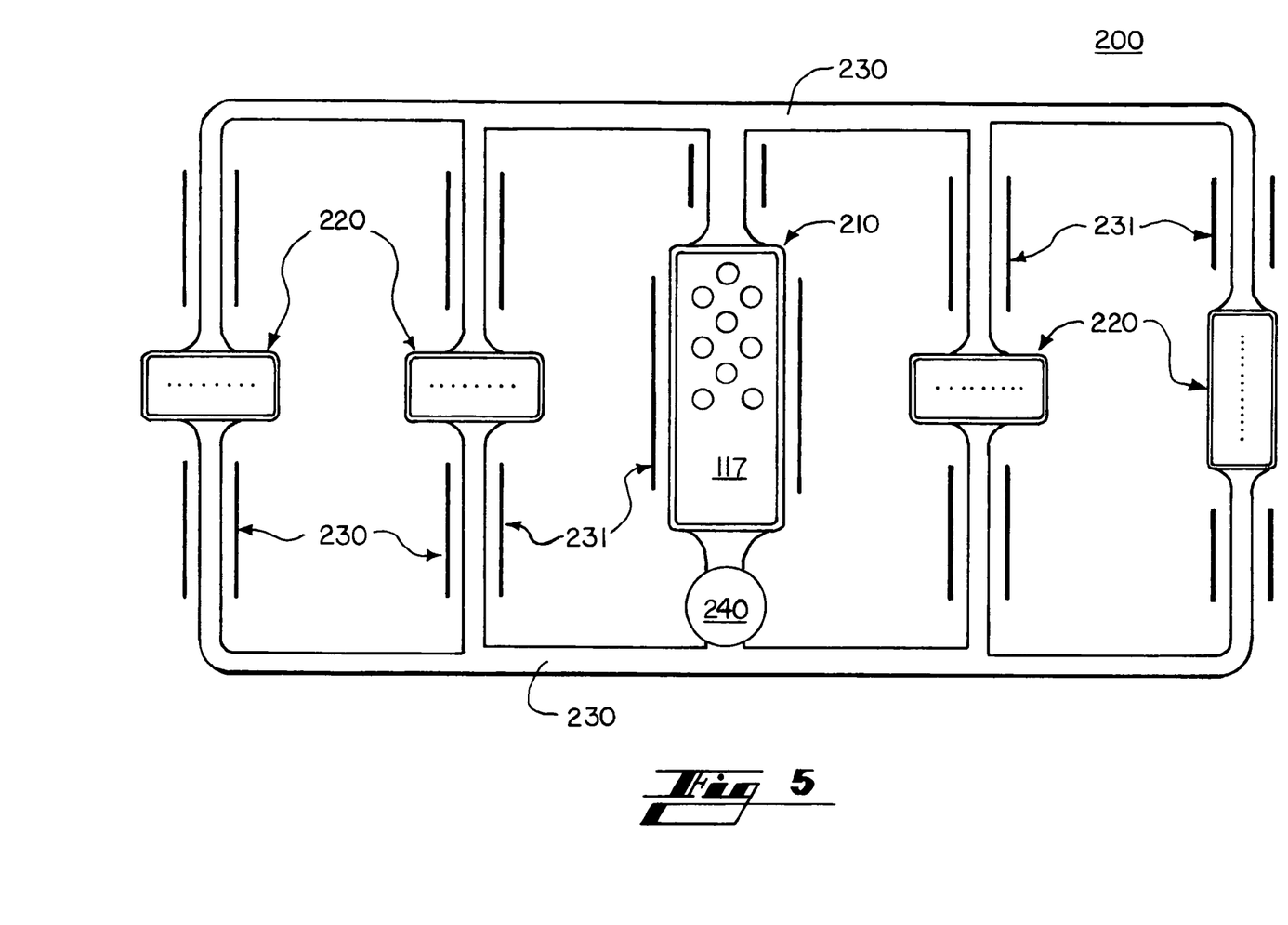
FIG. 5 is a plan view of an alternative configuration of the system for manufacturing carbon nanotubes of the present invention.

As will be readily apparent to those ordinarily skilled in the art, the carbon nanotube manufacturing system and method described above may easily be adapted to large-scale manufacturing processes, such as via incorporation of feedback and control means 160. Other adaptations may include the separate carbon dissolution portion 210 and carbon nanotube growth portion 220 of system 200, whereby carbon dissolution portion 210 may supply a plurality of carbon nanotube growth portions 220 with a carbon-saturated or carbon-supersaturated flux melt 117, such as via one or more conduits 230 and pump 240. Heating means 231 may be operable with conduit 230 whereby flux melt 117 may be maintained at a desired temperature to prevent undesired cooling (whether such undesired cooling be any cooling, or merely excessive cooling) so as to prevent premature carbon precipitation. Each carbon nanotube growth portion 220 may include one or more probe 131 including one or more nucleation site 133. Thus duplicate heating means, such as means 110 for creating flux melt 117, may be eliminated, and carbon nanotubes of different size, chirality, or the like, may be manufactured simultaneously from separate growth portions 220.

Another modification that may be made to adapt the system and method to a large-scale and/or commercial process includes modifying one or more of means 130 for contacting nucleation site 133 with flux melt 117 and means 140 for extracting probe 131 to include a motorized or manually operable spool, whereby one or more carbon nanotube may be extracted, as it is manufactured, directly on to a storage spool. Thus, one or more processing and/or packaging step may be avoided, and the carbon nanotube(s) may be shipped on the spool, and dispensed therefrom for use.

Figure 3:
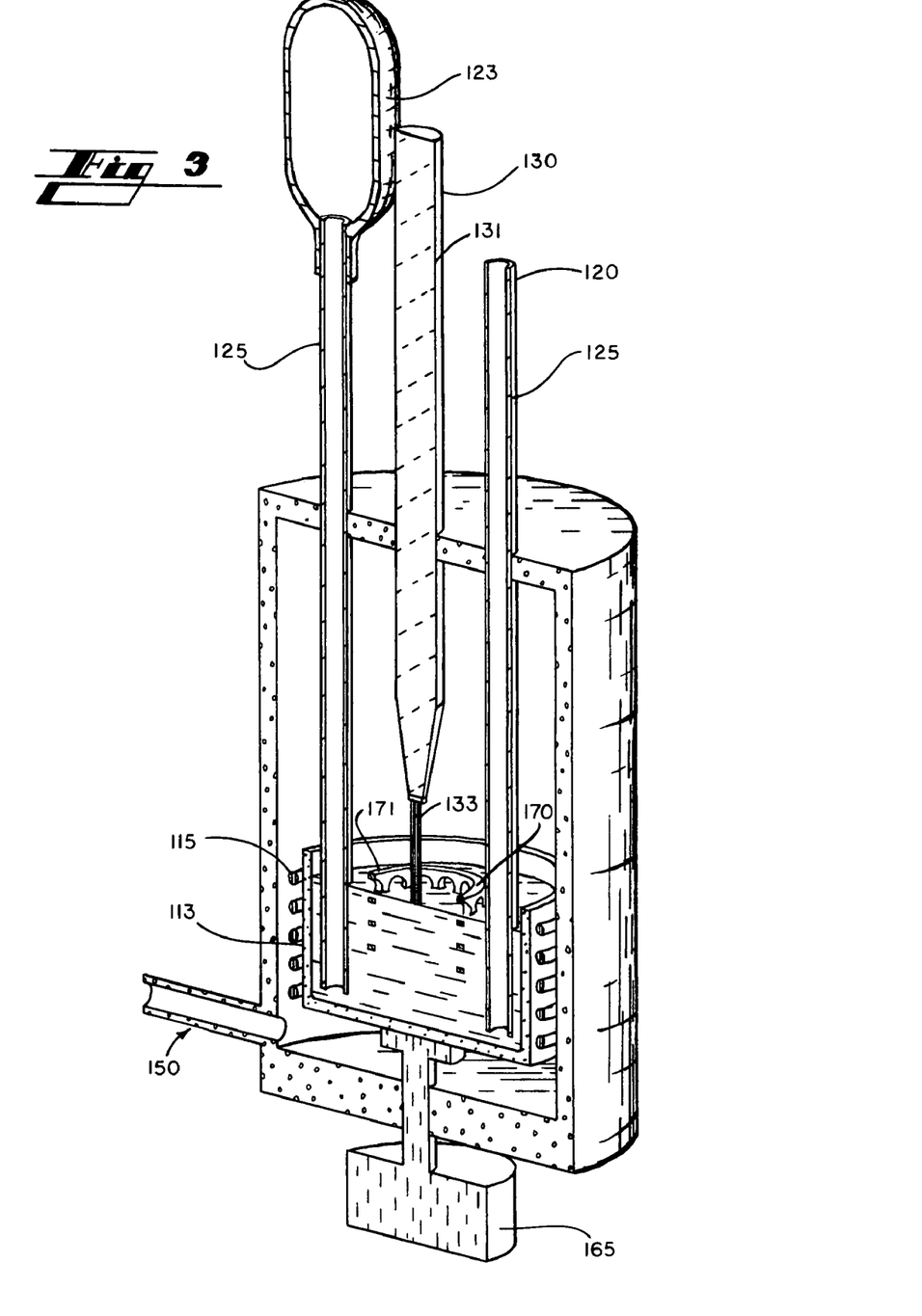
FIG. 3 is a cross-sectional view of the system for manufacturing carbon nanotubes according to an alternate configuration.

In addition to streamlining the manufacturing method and system of the present invention, modifications designed to improve or maintain quality may also be made. One such example involves diligent maintenance of the steady-state thermal gradient, and selection of an adequately small gradient to prevent undesired crystallization. Another alternative designed to improve the quality (i.e. decrease the defect rate) of the manufactured carbon nanotubes comprises use of one or more flow control means 170, such as one or more baffle 171, screen, or the like. Baffle 171 may be formed of alumina, zirconia, or other suitable ceramic material, a metallic material, or the like, and may be disposed such that any undesired fluid flow, such as waves, ripples, or other detrimental surface or sub-surface disruptions within flux melt 117 may be prevented, at least proximate nucleation site 133. Similarly, one or more vibration isolation means 180, such as spring 181, or other mechanical dampener, may be used to isolate furnace 111 or crucible 113 from a structure in which furnace 111 is housed, whereby vibrations from mechanical equipment, geological activity, human activity, or the like, may be dampened or absorbed to reduce or eliminate transmission thereof to flux melt 117 and/or nucleation site 133. Vibration isolation means 180 may, alternatively, be formed as a fluid (i.e. hydraulic or pneumatic) dampener, or the like. One or more baffle(s) 171, or other controllable insulation means, may also be employed to control fluid and/or heat flow within flux melt 117 to achieve or maintain a desired thermal gradient and degree of undercooling, as well as a location and size of cooler portion 117a, warmer portion 117b, and/or a portion of flux melt 117 associated with a transition therebetween. Selective movement or placement of the baffle(s) 171 may selectively allow or inhibit heat loss or gain, such as through convection, radiation, or the like.

Additionally, the manufacturing method of the present invention may be adapted for the manufacture of other elongate nanoscale structures, such as wires, belts, sheets, or the like, while taking advantage of the growth mechanism and the method for controlling the driving force of the growth mechanism, i.e. the degree of under-cooling. Similarly, the manufacturing method of the present invention may be adapted for the manufacture of elongate nanoscale structures of alternative materials. By way of example, and not limitation, boron-nitride nanotubes, belts, wires, sheets, or the like, may be manufactured via an analogous system adapted to create a melt of a suitable flux material, such as nickel, iron, magnesium, cobalt, lithium, calcium, among others, and combinations thereof, into which boron and nitrogen may be dissolved. The creation and maintenance of a thermal gradient within the flux melt may preferably result in at least one portion thereof becoming supersaturated with boron and nitrogen, such that selective and controlled precipitation may be used to grow one or more selected nanoscale structure. As discussed above, it will be apparent to those ordinarily skilled in the art that the growth rate, defect rate, material loss rate, and the like may be considered when selecting one or more parameter of the system to obtain desired manufacturing performance characteristics, such as throughput, efficiency, and the like.

Regardless of the material selected for the manufactured nanoscale structure, one or more dopant(s) may be included in the flux melt, in the atmosphere within the furnace or other means for creating the flux melt, or both, whereby such dopant(s) may be incorporated into the nanoscale structure to selectively alter a characteristic thereof, such as an electrical, physical, thermal, or other property. For example, boron may be included in a carbon/flux solution to ensure that carbon nanotubes manufactured therefrom exhibit metallic electrical properties. Carbon nanostructure dopants include boron, nitrogen, and combinations thereof, among others. Boron-nitride nanostructure dopants include carbon, among others.

Having thus described exemplary embodiments of the present invention, it should be noted by those skilled in the art that the within disclosures are exemplary only and that various other alternatives, adaptations, and modifications may be made within the scope and spirit of the present invention. Accordingly, the present invention is not limited to the specific embodiments as illustrated herein.

What is claimed is at least:

1. A method of manufacturing a carbon nanotube comprising the steps of:
    creating a flux melt;
    supplying carbon to said flux melt to create a carbon saturated flux melt;
    creating a supersaturated portion of said flux melt; and
    contacting a pre-selected seed carbon nanotube with said supersaturated portion of said flux melt such that one or more carbon atoms bond to said seed carbon nanotube.

2. The method of claim 1, wherein said step of supplying carbon to said flux melt comprises contacting a carbon source selected from the group consisting of carbon black, graphite, a hydrocarbon material, carbon monoxide, and an organometallic material with said flux melt.

3. The method of claim 1, wherein said step of creating a flux melt comprises the step of heating a flux material selected from the group consisting metals, metal-alloys, and metal-salts to a temperature from approximately 1300° C. to approximately 1800° C.

4. The method of claim 1, wherein said step of creating a flux melt comprises the step of heating a flux material selected from the group consisting metals, metal-alloys, and metal-salts to a temperature of approximately 1500° C.

5. The method of claim 1, wherein said step of creating a supersaturated portion of said flux melt comprises creating a steady-state thermal gradient within said flux melt.

6. The method of claim 1, further comprising extracting said carbon nanotube from said flux melt at a rate substantially equal to a rate of growth of said carbon nanotube.

7. The method of claim 1, further comprising the step of preventing oxidation of at least one of said flux melt and said carbon.

8. The method of claim 1, further comprising a step selected from the group consisting of preventing fluid flow within said flux melt, reducing fluid flow within said flux melt, and controlling fluid flow within said flux melt.

9. The method of claim 1, further comprising the steps of:
    monitoring a value of at least one parameter of a system for manufacturing a carbon nanotube; and
    adjusting at least one component of said system to adjust said value of at least one parameter to a predetermined value.

10. The method of claim 1, wherein contacting the seed carbon nanotube with the supersaturated portion of the flux melt removes a pentagonal carbon structure to expose a hexagonal carbon structure, and wherein the one or more carbon atoms epitaxially bond to the hexagonal carbon structure.

11. The method of claim 1, wherein the supersaturated portion of the flux melt is created such that pentagonal carbon structures dissolve in the supersaturated portion of the flux melt.

12. The method of claim 1, further comprising selecting the seed carbon nanotube based on a selected property of the seed carbon nanotube such that the manufactured carbon nanotube exhibits the selected property.

13. A method of manufacturing a plurality of carbon nanotubes comprising the steps of:
    creating a plurality of carbon supersaturated portions of at least one flux melt;
    contacting each of a plurality of seed carbon nanotubes with a respective one of said plurality of carbon supersaturated portions, whereby carbon atoms from each said carbon supersaturated portions bond to said seed carbon nanotubes; and
    extracting each carbon nanotube from the respective one of said plurality of carbon supersaturated portions at a rate approximately equal to a rate of growth of each respective carbon nanotube.

14. A method of elongating a seed nanotube, the method comprising:
    maintaining a thermal gradient within a molten flux material to maintain a supersaturated portion of the flux material;
    contacting the seed nanotube with the supersaturated portion of the molten flux material;
    epitaxially elongating the seed nanotube by precipitation of atoms from the molten flux material; and
    extracting the seed nanotube from the molten flux material as the seed nanotube is epitaxially elongated.

15. The method of claim 14, wherein the supersaturated portion of the molten flux material is maintained at a temperature of approximately 1300° C. to approximately 1800° C.

16. The method of claim 14, further comprising at least one of preventing fluid flow within the molten flux material, reducing fluid flow within the molten flux material, and controlling fluid flow within the molten flux material.

17. The method of claim 14, further comprising selecting the seed nanotube based on a selected property of the seed nanotube such that the epitaxially elongated nanotube exhibits the selected property.

18. The method of claim 14, further comprising detecting the formation of a defect in the nanotube, contacting the defect with the molten flux material to remove the defect, and restarting epitaxial elongation of the nanotube.

19. The method of claim 14, wherein the epitaxial elongation is substantially continued to elongate the seed nanotube to a length of a millimeter or greater.

* * * * *